F. W. TANNER.
HAY PRESS.
APPLICATION FILED APR. 14, 1910.

1,017,822.

Patented Feb. 20, 1912.
2 SHEETS—SHEET 1.

WITNESSES:

INVENTOR
Frank W. Tanner
BY
Hardway & Cortey
ATTORNEYS.

F. W. TANNER.
HAY PRESS.
APPLICATION FILED APR. 14, 1910.

1,017,822. Patented Feb. 20, 1912.

WITNESSES:
A. Tompkins
E. Fruehbeck

INVENTOR
Frank W. Tanner
BY
Hardway & Cathey
ATTORNEYS

UNITED STATES PATENT OFFICE.

FRANK W. TANNER, OF FAIRBANKS, TEXAS.

HAY-PRESS.

1,017,822. Specification of Letters Patent. Patented Feb. 20, 1912.

Application filed April 14, 1910. Serial No. 555,396.

*To all whom it may concern:*

Be it known that I, FRANK W. TANNER, a citizen of the United States, residing at Fairbanks, in the county of Harris and State of Texas, have invented certain new and useful Improvements in Hay-Presses, of which the following is a specification.

My invention relates to new and useful improvements in hay presses.

The object of the invention is to provide a device of the character described which will receive the hay fed thereto and automatically compresses the same into a bale.

My invention also has for its object simplicity and cheapness of construction and ease of operation.

Figure 1:
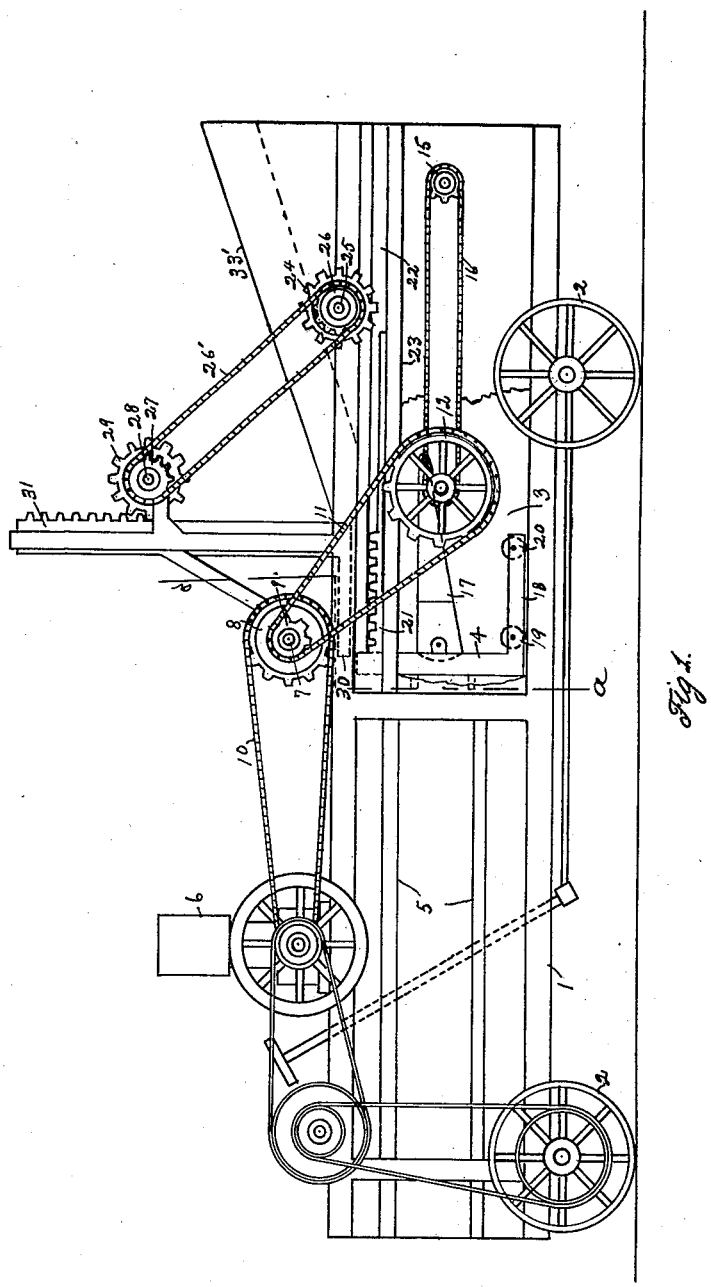
Figure 2:
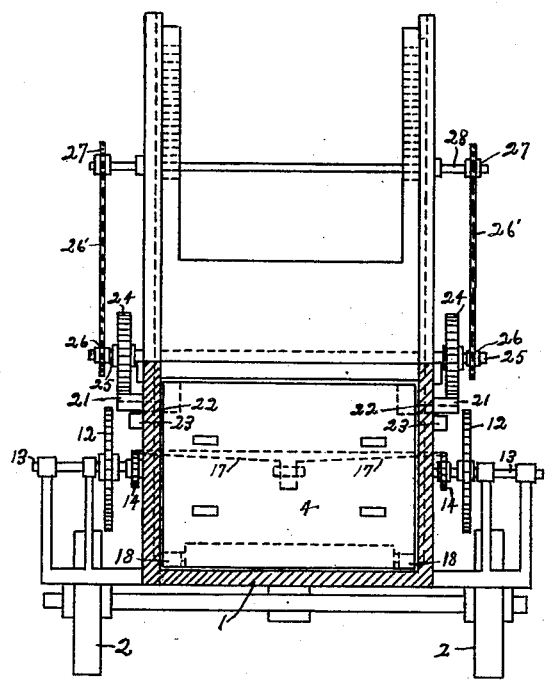
Figure 3:
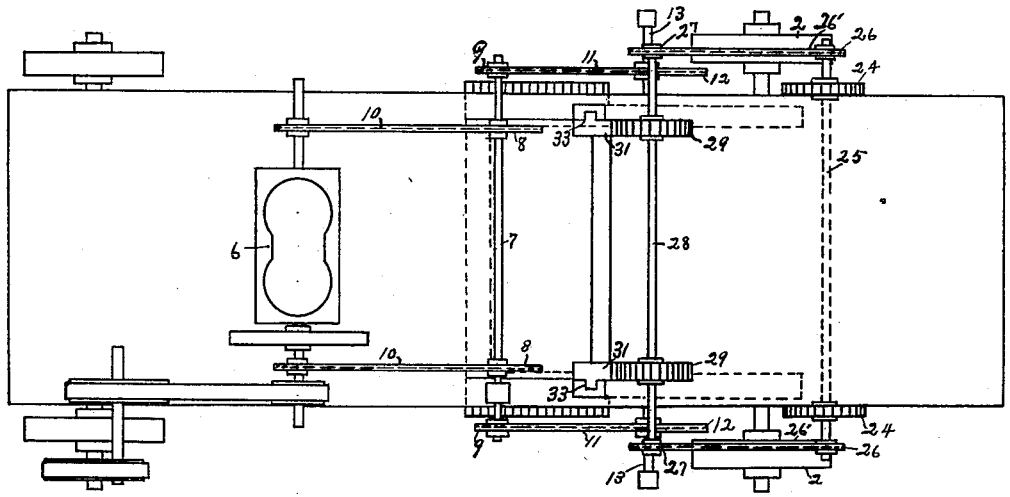

With the above and other objects in view my invention has particular relation to certain novel features of construction and operation an example of which is given in this specification and illustrated in the accompanying drawings, wherein:

Figure 1 is a side elevation of my complete press showing a portion of the near wall of the compress chamber broken away. Fig. 2 is a vertical sectional view of the rear end thereof taken on the line $a$—$a$ of Fig. 1. Fig. 3 is a plan view thereof.

Referring now more particularly to the drawings, wherein like numerals of reference designate similar parts in each of the figures, the numeral 1 refers to a supporting frame mounted on suitable carriers 2. The rear end of the framework carries a compress chamber 3 in which the plunger 4 reciprocates and the front end of said framework is provided with a wiring chamber 5 which is designed to receive the bale when formed and retain the same until it is suitably secured by the tie wires.

Mounted upon the chamber 5 is a suitable motor 6 which has an operative connection with the traction wheels 2, and by means of which the device may be moved from place to place.

The numeral 7 refers to a transverse shaft which operates in suitable bearings carried by the walls of chamber 3 which carries upon each end large and small sprocket wheels 8 and 9 the former of which receive motion from the motor through sprocket chains 10 and the latter of which are designed to mesh with sprocket chains 11 and transmit motion to the operative mechanism.

On either side of the compress chamber I have mounted the sprocket wheels 12 rigidly secured to shafts 13 which operate in suitable bearings, carried by the frame work and carry upon their inner ends sprocket wheels 14. In longitudinal alinement with these sprocket wheels and carried by suitable shafts are sprocket wheels 15, whose shafts operate in suitable bearings in the walls of chambers 3.

The numeral 16 refers to a sprocket chain which operates upon the sprocket wheels 14 and 15 and is provided for a purpose to be hereinafter set forth.

The plunger 4 shown in elevation in Fig. 2 and an edge view thereof is shown in Fig. 1 is shaped so as to conform to the contour of the chamber 3 and is designed to reciprocate longitudinally therein.

The numeral 17 refers to links pivotally secured to the plunger at their forward ends and also secured to sprocket chains 16 at their other ends and designed to impart a reciprocating motion from said chains to said plunger. The lower edge of the plunger carries, at either side, rearwardly extending runners 18 provided with transverse rollers 19 and 20 which contact with supporting frame 1 and conduce to an easy movement of the plunger. The upper edge of the plunger is provided at each side with a rearwardly extending beam 21 which projects laterally through a longitudinal slot 22, in the casing, and rests upon a beam 23, secured upon the side of chamber 3. This beam 21 is provided with gear teeth upon its upperside, for a purpose to be set forth hereinafter.

The numeral 24 refers to a gear wheel secured upon shaft 25 and designed to mesh with the gear teeth of beam 21 by means of which said gear wheel is operated.

The numeral 26 refers to a gear wheel also rigidly mounted on shaft 25 and designed to mesh with sprocket chain 26' which in turn meshes with a sprocket wheel 27, rigidly mounted on shaft 28 which also carries the rigidly mounted gear wheel 29.

The numeral 30 refers to a vertically reciprocating plunger which is provided at each side, with an upwardly extending beam 31, provided with rack teeth on its rear side. These teeth extend only a portion of the length of the beam 31. This allows the plunger to remain suspended for a limited time, thus allowing plunger 4 to be withdrawn from its forward stroke before the downward stroke of plunger 30 takes place thereby allowing the operator time to feed the press without danger of being caught between the plunger and the frame work of the press. The teeth of this beam mesh with the gear teeth of wheels 29 and the beam 31 and plunger connected therewith are moved up and down through the operation of said wheels. The inner walls of the chamber 3 are provided with vertically extending grooves 33 within which the plunger reciprocates, as shown in Fig. 3.

The hay to be baled is fed into the compress over table 33' and enters the compress chamber in front of plunger 4 which is, at that time, in its withdrawn position. The plunger is then forced forward by the chains 16, operating through links 17, and the hay in front of the plunger is compressed. As the plunger moves forward the rack teeth of beam 21 engage with gear wheel 24 and rotate the same, and through the gear wheels and sprocket chain just described operate to elevate plunger 30 out of the path of plunger 4. As the plunger 4 moves back the operation of these gear wheels is reversed and the plunger 30 descends and compresses the feed of hay above and it is to be observed that the operative mechanism of plunger 30 is so geared that the ascent and descent of the said plunger will be so timed that the same will not come into contact with the plunger 4. This process is continued and the compressed hay is gradually forced into wiring chamber 5, which is of a suitable size to contain a bale, until a full bale is forced into said chamber, where it may be bound in the usual manner. A second bale is then formed in the same manner as the first and the formed bale is forced from the cage, by the forming bale.

What I claim is:

1. In a hay press a supporting frame; a compress chamber carried thereby; a plunger arranged to reciprocate therein; an operative mechanism connected to the plunger for imparting a reciprocating motion thereto; a rack member having teeth only a portion of the length thereof connected to said plunger and operated thereby; a second plunger also designed to operate in said chamber; a rack member carried by said second plunger, having teeth extending only a portion of the length thereof, said plunger being arranged to alternately operate against the chamber contents, at right angles to each other; an operative mechanism operated by the teeth of the first mentioned rack member and operating the other rack member and the plunger carrying the same.

2. A hay press comprising a supporting frame and a motive means carried thereby; a compress chamber carried by said frame; a wiring chamber adjacent to the compress chamber and disposed to receive therefrom; a plunger reciprocating in the compress chamber lengthwise thereof and another plunger reciprocating therein at right angles to the path of the first mentioned plunger and both plungers arranged to operate against the chamber contents; rack members carried by said plungers; rack teeth carried by said members extending only a portion of the length of said members, an operative mechanism operated by the rack member of the first mentioned plunger and having operative connection with the rack member of the second mentioned plunger and means for reciprocating the first mentioned plunger.

In testimony whereof I have signed my name to this specification in the presence of two subscribing witnesses.

FRANK W. TANNER.

Witnesses:
CHAS. R. MUNGER,
H. S. BARKER.

Copies of this patent may be obtained for five cents each, by addressing the "Commissioner of Patents, Washington, D. C."